(12) United States Patent
Ma et al.

(10) Patent No.: US 9,369,300 B2
(45) Date of Patent: Jun. 14, 2016

(54) METHOD AND MEANS FOR STATE TRANSITION OF ETHERNET LINEAR PROTECTION SWITCHING

(75) Inventors: Xiaohua Ma, Shanghai (CN); Tianfang Xiong, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 917 days.

(21) Appl. No.: 13/377,486

(22) PCT Filed: Aug. 17, 2009

(86) PCT No.: PCT/CN2009/073311
§ 371 (c)(1),
(2), (4) Date: Dec. 9, 2011

(87) PCT Pub. No.: WO2011/020236
PCT Pub. Date: Feb. 24, 2011

(65) Prior Publication Data
US 2012/0182861 A1    Jul. 19, 2012

(51) Int. Cl.
*H04L 12/26* (2006.01)
*H04L 12/413* (2006.01)
*H04L 12/24* (2006.01)

(52) U.S. Cl.
CPC ............. *H04L 12/413* (2013.01); *H04L 41/06* (2013.01)

(58) Field of Classification Search
None
See application file for complete search history.

(56) References Cited

U.S. PATENT DOCUMENTS

| | | | |
|---|---|---|---|
| 6,438,626 B1 | 8/2002 | Kawauchi | |
| 2004/0179472 A1* | 9/2004 | Khalilzadeh et al. | 370/227 |
| 2006/0224659 A1* | 10/2006 | Yu | 709/201 |
| 2007/0150613 A1 | 6/2007 | Lobig et al. | |
| 2007/0292129 A1* | 12/2007 | Yan et al. | 398/5 |

FOREIGN PATENT DOCUMENTS

| | | |
|---|---|---|
| CN | 1295397 | 5/2001 |
| CN | 1725676 | 1/2006 |
| CN | 1791096 | 6/2006 |
| CN | 101394261 | 3/2009 |
| JP | 5530520 | 6/2014 |
| KR | 20060135704 | 12/2006 |

OTHER PUBLICATIONS

ITU-T Telecommunication Standardization Sector of ITU; Series G: Transmission Systems and Media, Digital Systems and Networks, Ethernet over Transport aspects—General Aspects; Series Y: Global Information Infrastructure, Internet Protocol Aspects and Next-Generation Networks, Internet Protocol Aspects—Transport; Ethernet Protection Switching; G.8031/Y.1342; Jun. 2006.

Sato, K. et al; Standardization status of Ethernet linear protection switching; IEICE Technical Report, CS 2007-55 to 72, The Institute of Electronics, Information and Communication Engineers, Japan, Jan. 21, 2008, vol. 107, No. 463, pp. 101 to 104.

Kasahara, Y. et al; A study of Protection Switching for Ethernetwork; IEICE Technical Report, CS 2004-79 to 87; The Institute of Electronics, Information and Communication Engineers, Japan, Oct. 21, 2004, vol. 104, No. 380, pp. 1 to 6.

* cited by examiner

*Primary Examiner* — Rhonda Murphy
(74) *Attorney, Agent, or Firm* — Patti & Malvone Law Group, LLC

(57) ABSTRACT

The present invention relates to state transition, especially relates to method and means for state transition of Ethernet linear protection switching. It is provided a method of state transition for a local end of a protection group of Ethernet linear protection switching in a local network element, and the method comprises receiving a first message configured to change the state of the local end with a first state, the first message being overridden by the first state; receiving a second message configured to change the state of the local end; determining a second state of the local end on the basis of the first message and the second message; and changing the state of the local end into the second state. In this way, there will be no unnecessary state transition and then no traffic loss caused by the unnecessary state transition.

16 Claims, 9 Drawing Sheets

METHOD AND MEANS FOR STATE TRANSITION OF ETHERNET LINEAR PROTECTION SWITCHING

FIELD OF THE INVENTION

The present invention relates to state transition, especially relates to method and means for state transition of Ethernet linear protection switching.

BACKGROUND OF THE INVENTION

In ITU-T Recommendations G.8031/Y.1342, it is defined that the APS (Automatic Protection Switching) protocol and linear protection switching mechanisms for point-to-point VLAN (Virtual LAN) based ETH (Ethernet layer network) SNC (Sub-Network Connection) in Ethernet transport networks.

The linear protection switching mechanisms to be applied to VLAN-based Ethernet networks as described in ITU-T Recommendations G.8010/Y.1306. Protection switching is a fully allocated survivability mechanism. It is fully allocated in the sense that the route and bandwidth of the protection entity is reserved for a selected working entity. It provides a fast and simple survivability mechanism. It is easier for the network operator to grasp the status of the network (e.g., active network topology) with a protection switching than with other survivability mechanisms such as RSTP (Rapid Spanning Tree Protocol).

Two kinds of protection switching architecture are specified, they are linear 1+1 protection switching architecture and linear 1:1 protection switching architecture. The linear 1+1 protection switching architecture operates with either unidirectional or bidirectional switching. The linear 1:1 protection switching architecture operates with bidirectional switching.

In the linear 1+1 protection switching architecture, a protection transport entity is dedicated to each working transport entity. The normal traffic is copied and fed to both working and protection transport entities with a permanent bridge at the source of the protected domain. The traffic on working and protection transport entities is transmitted simultaneously to the sink of the protected domain, where a selection between the working and protection transport entities is made based on some predetermined criteria, such as server defect indication.

Although selection is made only at the sink of the protected domain in linear 1+1 protection switching architecture, bidirectional linear 1+1 protection switching needs APS coordination protocol so that selectors for both direction selects the same entity. On the other hand, unidirectional linear 1+1 protection switching does not need APS coordination protocol.

In the linear 1:1 protection switching architecture, the protection transport entity is dedicated to the working transport entity. However, the normal traffic is transported either on the working transport entity or on the protection transport entity using a selector bridge at the source of the protected domain. The selector at the sink of the protected domain selects the entity which carries the normal traffic. Since source and sink need to be coordinated to ensure that the selector bridge at the source and the selector at the sink select the same entity, APS coordination protocol is necessary.

Two kinds of operations, revertive and non-revertive operations, are also specified.

In revertive operation, normal traffic signal is restored to the working transport entity after the condition(s) causing a switch has cleared. In the case of clearing a command (e.g., a Forced Switch command), this happens immediately. In the case of clearing of a defect, this generally happens after the expiry of a "Wait-to-Restore" timer, which is used to avoid chattering of selectors in the case of intermittent defects.

In non-revertive operation, normal traffic signal is allowed to remain on the protection transport entity even after a switch reason has cleared. This is generally accomplished by replacing the previous switch request with a Do not Revert request, which is low priority.

In addition, several states are specified in G.8031 and the priority between them is also specified.

SUMMARY OF THE INVENTION

Inventors of the present invention find there are some problems in state transition of the scenarios shown in FIG. 1 to FIG. 6.

As shown in FIG. 1 (West is a local NE (network element), while East is a far-end NE), in scenario 1a of 1:1 bidirectional revertive operation, the current state of the local NE is State D (i.e. Forced Switch, a working entity is standby while a protection entity is active) after receiving a Force Switch command from the local NE. When a Clear command is issued to clear the local Forced Switch command, the local NE also receives a far-end Forced Switch command via APS that is previously overridden by the local Forced Switch command. According to state transition specification in G.8031, the state changes from State D to State A (i.e. No Request, a working entity is active while a protection entity is standby) by taking only the Clear command into consideration. And then the state of the local NE changes from State A to State B (i.e. No Request, a working entity is standby while a protection entity is active) when the far-end Forced Switch command is reasserted.

The state transition of scenario 1a will cause not only the state transition into a lower priority state when there is a higher priority command because the Forced Switch command's priority is higher than state A's priority according to specification in G.8031, but also cause traffic loss when the local NE is in state A because the far-end NE in State D is delivering traffic on a protection entity while the local NE in State A is delivering traffic on a working entity. In addition, extra APS algorithm re-computation and protection switch time is caused.

As shown in FIG. 2, in scenario 1b of 1:1 bidirectional non-revertive operation, the current state of the local NE is state D after receiving a Forced Switch command from the local NE. When a Clear command is issued to clear the local Forced Switch command, the local NE also receives a far-end Forced Switch command via APS that is previously overridden by the local Forced Switch command. According to state transition specification in G.8031, the state changes from State D to State I (i.e. Do Not Revert, a working entity is standby while a protection entity is active) by taking only the Clear command into consideration. And then the state of the local NE changes from State I to State B when the far-end Forced Switch command is reasserted.

The state transition of scenario 1b will cause not only the state transition into a lower priority state when there is a higher priority command because the Forced Switch command's priority is higher than state I's priority according to specification in G.8031, but also cause extra APS algorithm re-computation and protection switch time.

As shown in FIG. 3, in scenario 2a of 1:1 bidirectional revertive operation, the current state of the local NE is state G (i.e. Manual Switch, a working entity is standby while a protection entity is active) after receiving a Manual Switch command from the local NE. When a Clear Command is issued to clear the local Manual Switch command, the local NE also receives a far-end Manual Switch command via APS that is previously overridden by the local Manual Switch command. According to state transition specification in G.8031, the state changes from State G to State A by taking only the Clear command into consideration. And then the state of the local NE changes from State A to State B when the far-end Manual Switch command is reasserted.

The state transition of scenario 2a will cause not only the state transition into a lower priority state when there is a higher priority command because the Manual Switch command's priority is higher than state A's priority according to specification in G.8031, but also cause traffic loss when the local NE is in state A because the far-end NE in State G is delivering traffic on a protection entity while the local NE in State A is delivering traffic on a working entity. In addition, extra APS algorithm re-computation and protection switch time is caused.

As shown in FIG. 4, in scenario 2b of 1:1 bidirectional non-revertive operation, the current state of the local NE is state G after receiving a Manual Switch command from the local NE. When a Clear Command is issued to clear the local Manual Switch command, the local NE also receives a far-end Manual Switch command via APS that is previously overridden by the local Manual Switch command. According to state transition specification in G.8031, the state changes from State G to State I by taking only the Clear command into consideration. And then the state of the local NE changes from State I to State B when the far-end Manual Switch command is reasserted.

The state transition of scenario 2b will cause not only the state transition into a lower priority state when there is a higher priority command because the Manual Switch command's priority is higher than state I's priority according to specification in G.8031, but also cause extra APS algorithm re-computation and protection switch time.

As shown in FIG. 5, in scenario 3a of 1:1 bidirectional revertive operation, the current state of the local NE is State F (i.e. Signal Failure on Protection, a working entity is active while a protection entity is standby) after Signal Failure on Protection is detected by the local NE. When the local NE detects that Signal Failure on Protection has recovered, the local NE also detects Signal Failure on Working that is overridden by Signal Failure on Protection detected by the local NE. According to state transition specification in G.8031, the state changes from State F to State A. And then the state changes from State A to State E (i.e. Signal Failure on Working, a working entity is standby while a protection entity is active) because Signal Failure on Working is detected by the local NE.

The state transition of scenario 3a will cause not only the state transition into a lower priority state when there is a higher priority state because the Signal Failure on Working's priority is higher than state A's priority according to specification in G.8031, but also cause traffic loss when the local NE is in state A because there is Signal Failure on Working while the local NE in State A is delivering traffic on a working entity. In addition, extra APS algorithm re-computation and protection switch time is caused.

Analysis of scenario 3b of 1:1 bidirectional non-revertive operation shown in FIG. 6 is similar to that of scenario 3a.

As shown in FIG. 7, in scenario 4 of 1:1 bidirectional non-revertive operation, the current state of the local NE is state K (i.e. Exercise, a working entity is standby while a protection entity is active) after receiving an Exercise command from the local NE. When a Clear Command is issued to clear the local Exercise command, the local NE also receives a far-end Exercise command via APS that is previously overridden by the local Exercise command. According to state transition specification in G.8031, the state changes from State K to State I by taking only the Clear command into consideration. And then the state of the local NE changes from State I to State M (i.e. Reverse Request, a working entity is standby while a protection entity is active) when the far-end Exercise command is reasserted.

The state transition of scenario 4 will cause not only the state transition into a lower priority state when there is a higher priority command because the Exercise command's priority is higher than state I's priority according to specification in G.8031, but also cause extra APS algorithm re-computation and protection switch time.

According to the above analysis, it would be advantageous to reduce the unnecessary state transition so as to reduce traffic loss. It would also be desirable to reduce protection switch time.

To better address one or more of the above concerns, according to a first aspect of the present invention, it is provided a method of state transition for a local end of a protection group of Ethernet linear protection switching in a local network element, and the method comprises:

receiving a first message configured to change the state of the local end with a first state, the first message being overridden by the first state;

receiving a second message configured to change the state of the local end;

determining a second state of the local end on the basis of the first message and the second message; and changing the state of the local end into the second state.

Both the first message overridden by the first state and the second message are taken into consideration for the state transition, so an unnecessary middle state is avoided and there will be less traffic loss and protection switch time.

According to a second aspect of the present invention, it is provided a state transition means for state transition for a local end of a protection group of Ethernet linear protection switching in a local network element, and the state transition means comprises:

a first receiving means configured to change the state of the local end with a first state, the first message being overridden by the first state;

a second receiving means configured to receive a second message configured to change the state of the local end;

a determining means configured to determine a second state of the local end on the basis of the first message and the second message; and a changing means configured to change the state of the local end into the second state.

These and other aspects of the invention will be apparent from and elucidated with reference to the embodiments described hereinafter.

DESCRIPTION OF THE DRAWINGS

The above and other objects and features of the present invention will become more apparent from the following detailed description considered in connection with the accompanying drawings, in which:

FIG. 1 depicts a schematic diagram of existing state transition in scenario 1a;

FIG. 3 depicts a schematic diagram of existing state transition in scenario 2a;

The same reference numerals are used to denote similar parts throughout the figures.

DETAILED DESCRIPTION

Firstly, it is provided a method of state transition for a local end of a protection group of Ethernet linear protection switching in a local NE.

A protection group comprises a working entity and a protection entity. There are two ends in a protection group, one is the local end and another is a far-end. G.8031 specifies several states. States of the local end and the far end can be different or same. A state/command having a relative higher priority can change a state having a relative lower priority. Table 1 shows part of states/commands specified in G.8031 and the priority between them.

TABLE 1

| | |
|---|---|
| Lockout of Protection (LO) | Priority |
| Signal Fail for Protection (SF-P) | Highest |
| Forced Switch (FS) | |
| Signal Fail for Working (SF) | |
| Signal Degrade (SD) | |
| Manual Switch (MS) | |
| Manual Switch to working (MS-W) | |
| Wait to Restore (WTR) | |
| Exercise (EXER) | |
| Reverse Request (RR) | |
| Do Not Revert (DNR) | |
| No Request (NR) | lowest |

Meaning of part of the commands is explained in the following part.

Lockout of protection—This command prevents a working signal from being selected from the protection transport entity. This effectively disables the protection group.

Force switch normal traffic signal-to-protection—Forces normal traffic signal to be selected from the protection transport entity.

Manual switch normal traffic signal-to-protection—In the absence of a failure of a working or protection transport entity, forces normal traffic signal to be selected from the protection transport entity.

Manual switch normal traffic signal-to-working—In the absence of a failure of a working or protection transport entity in non-revertive operation, forces normal traffic signal to be selected from the working transport entity.

Wait-to-restore normal traffic signal—In revertive operation, after the clearing of a Signal Fail (or Signal Degrade if applicable) on the working transport entity, maintains normal traffic signal as selected from the protection transport entity until a Wait-to-Restore timer expires. The state will be changed to No Request if the timer expires prior to any other event or command. This is used to prevent frequent operation of the selector in the case of intermittent failures.

Exercise signal—Exercise of the APS protocol. The signal is chosen so as not to modify the selector.

Do-not-revert normal traffic signal—In non-revertive operation, this is used to maintain a normal traffic signal selected from the protection transport entity.

No request—No Request is the state entered by the local priority under all conditions where no local protection switching requests (including wait-to-restore and do-not-revert) are active. Normal traffic signal is selected from the corresponding transport entity.

Clear—Clears the active near end Lockout of Protection, Forced Switch, Manual Switch, Wait To Restore state, or Exercise command.

Figure 8:
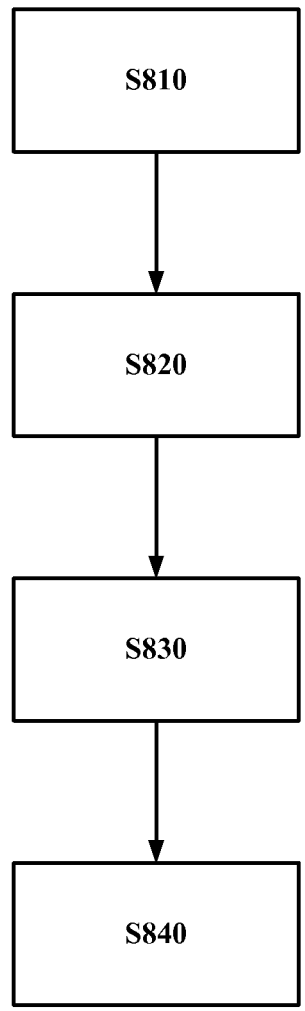
FIG. 8 depicts a schematic diagram of a flowchart of a method according to the invention.

FIG. 8 depicts a schematic diagram of a flowchart of the method. The method comprises the following steps.

First, in step S810, the local NE receives a first message configured to change the state of the local end with a first state. The first message is overridden by the first state. The first message is overridden by the first state for many reasons, for example, the first message's priority is the same as the first state's priority or the state to be obtained by the first message is the same as the first state.

Second, in step S820, the local NE receives a second message configured to change the state of the local end. The second message is received by the local NE after the time or at the same time when the first message is received. The local NE can set a predefined timer and update received messages periodically according to the predefined timer.

Then, in step S830, the local NE determines a second state of the local end on the basis of the first message and the second message. In one period determined by the predefined timer, the local UE receives both the first message and the second message and determines the second state based on the first message and the second message.

Finally, in step S840, the local NE changes the state of the local end into the second state.

In one embodiment of the method, the first state is that a first Forced Switch command from the local network element has been executed, a working entity of the local end is standby and that a protection entity of the local end is active. The first message is a second Forced Switch command from a far-end network element. The second message is a Clear command. And the second state is that there is no request, the working entity is standby and that the protection entity is active.

Figure 1:
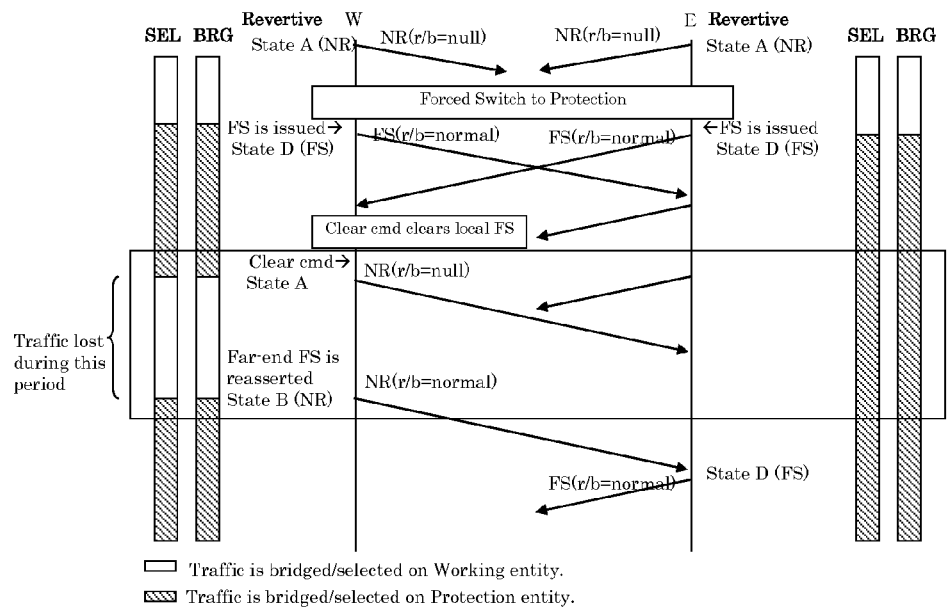
Figure 9:
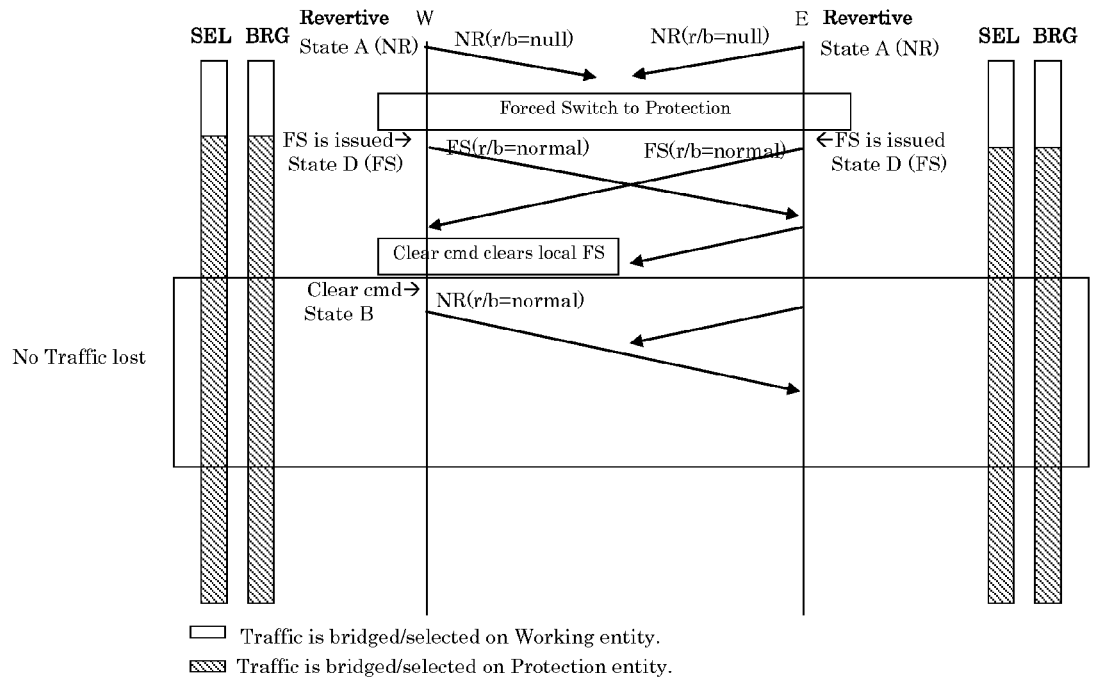
FIG. 9 depicts a schematic diagram of new state transition in scenario 1*a*.

FIG. 9 depicts a schematic diagram of new state transition in scenario 1*a*. Referring to FIG. 9, in scenario 1*a* of 1:1 bidirectional revertive operation, the current state of the local NE is State D after receiving a Force Switch command from the local NE. When a Clear command is issued to clear the local Forced Switch command, the local NE also receives a far-end Forced Switch command via APS that is previously overridden by the local Forced Switch command. According to one embodiment of the present invention, the state changes directly from State D to State B by taking both the Clear command and the far-end Forced Switch command into consideration. In this way, compared with the process shown in FIG. 1, there will be no unnecessary state transition and no traffic loss.

Figure 2:
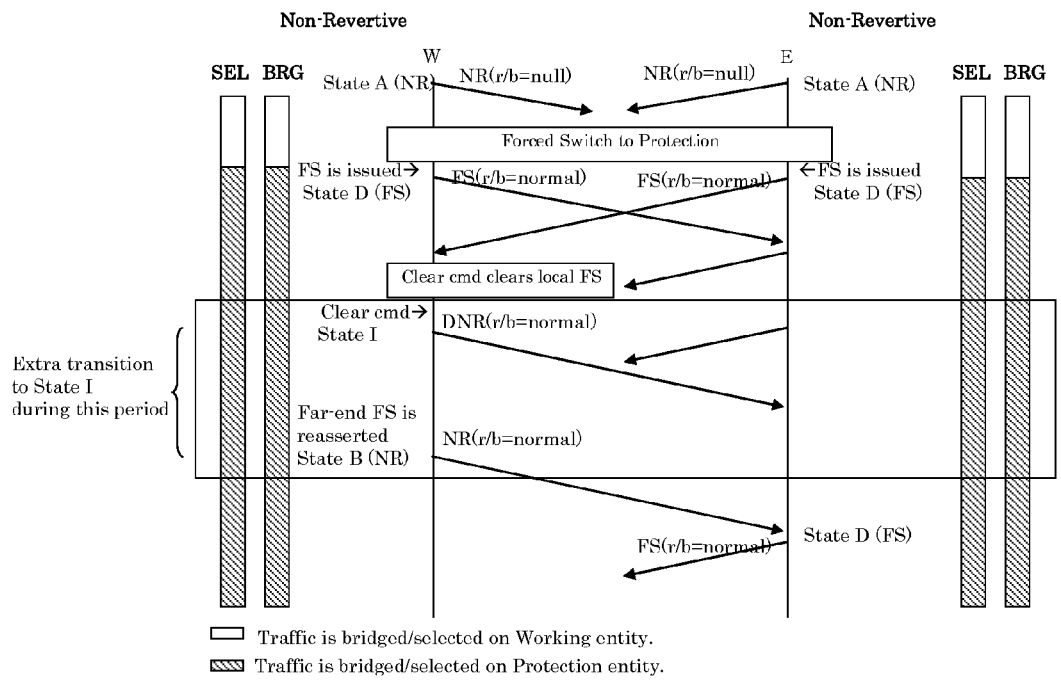
FIG. 2 depicts a schematic diagram of existing state transition in scenario 1b.
Figure 10:
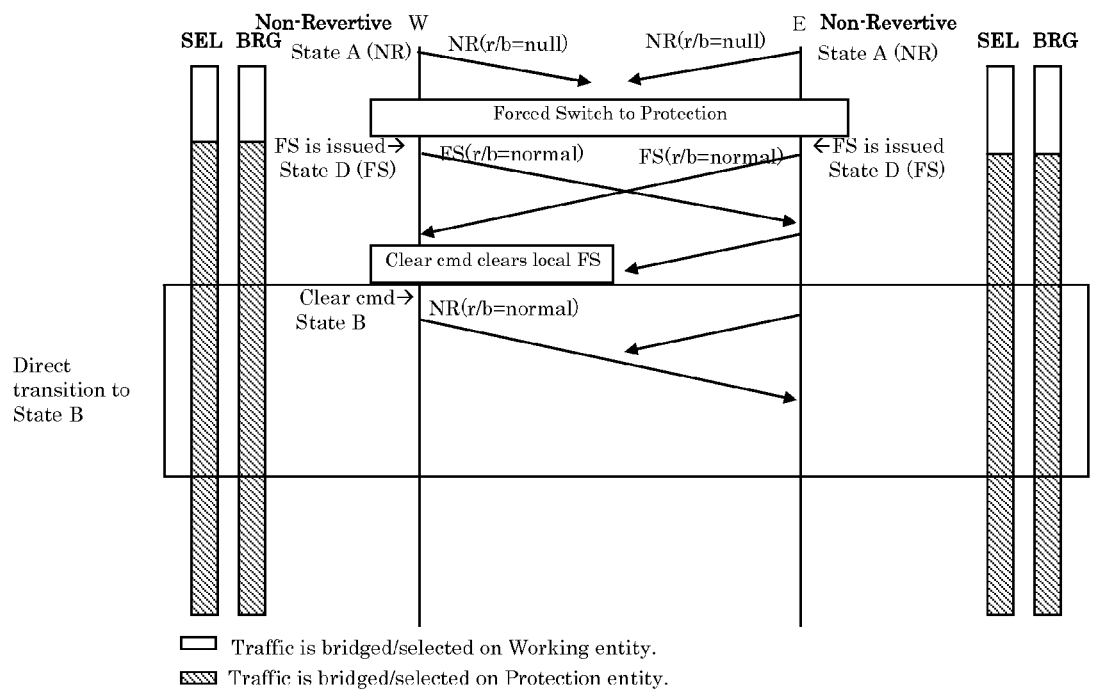
FIG. 10 depicts a schematic diagram of new state transition in scenario 1*b*.

FIG. 10 depicts a schematic diagram of new state transition in scenario 1b of 1:1 bidirectional non-revertive operation. The state transition process is the same as the process described in FIG. 9 and there will be no unnecessary state transition compared with the state transition process shown in FIG. 2.

In another embodiment of the method, the first state is that a first Manual Switch command from the local network element has been executed, a working entity of the local end is standby and that a protection entity of the local end is active. The first message is a second Manual command from a far-end network element. The second message is a Clear command. The second state is that there is no request, the working entity is standby and that the protection entity is active.

Figure 3:
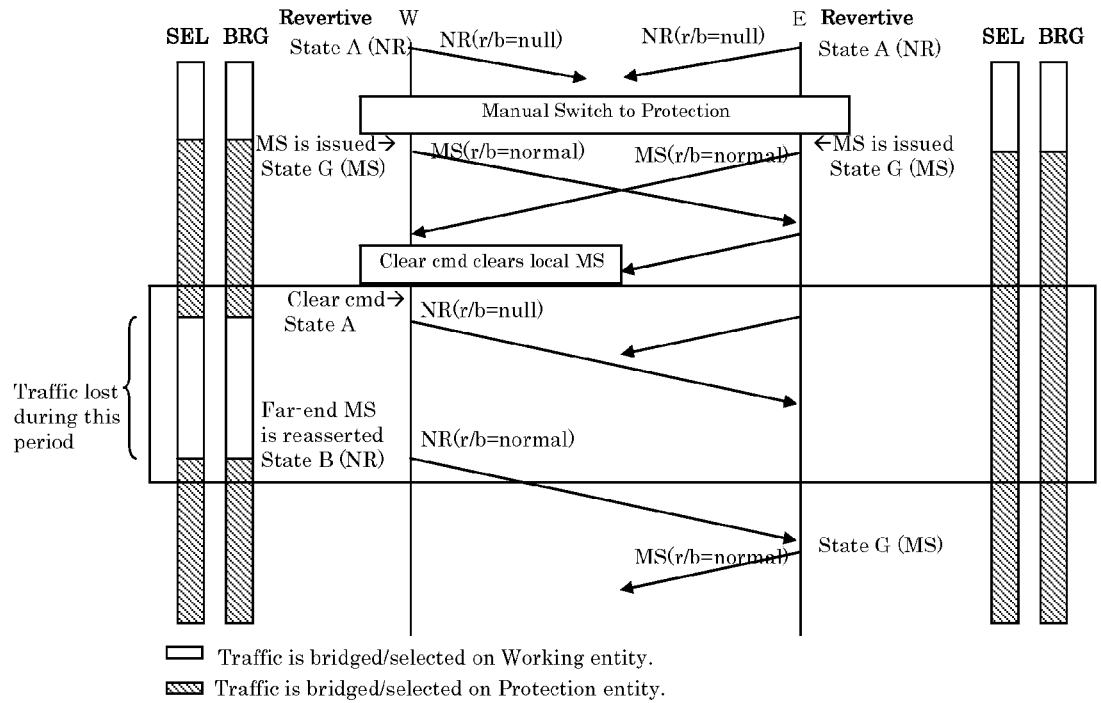
Figure 11:
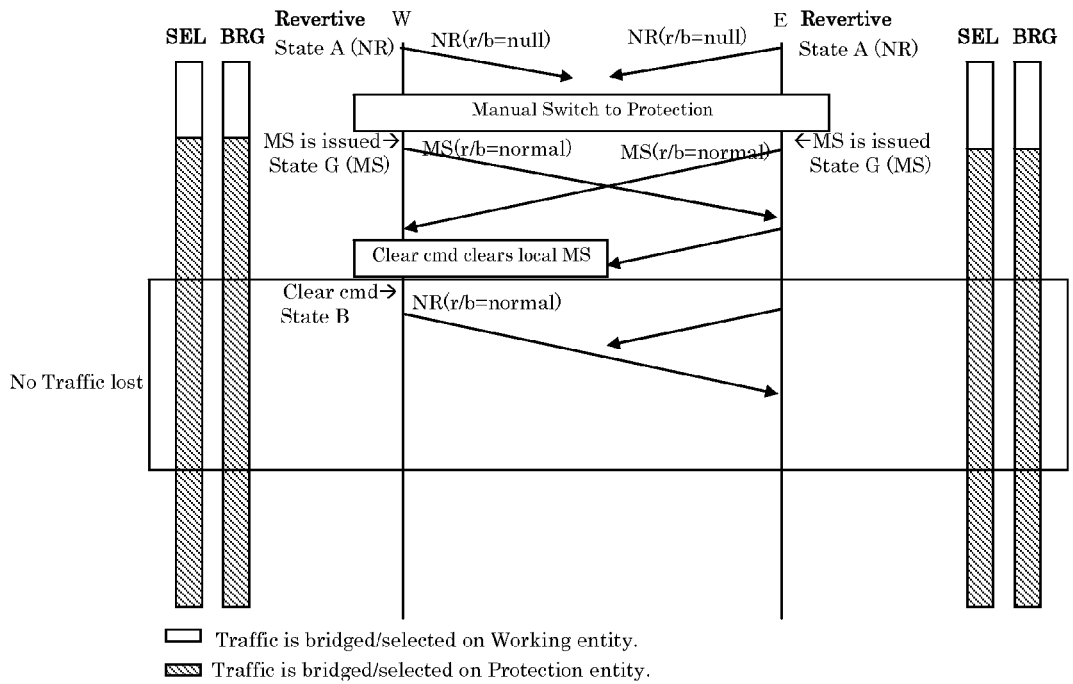
FIG. 11 depicts a schematic diagram of new state transition in scenario 2*a*.

FIG. 11 depicts a schematic diagram of new state transition in scenario 2a. Referring to FIG. 11, in scenario 2a of 1:1 bidirectional revertive operation, the current state of the local NE is State G after receiving a Manual Switch command from the local NE. When a Clear command is issued to clear the local Manual Switch command, the local NE also receives a far-end Manual Switch command via APS that is previously overridden by the local Manual Switch command. According to one embodiment of the present invention, the state changes directly from State G to State B by taking both the Clear command and the far-end Manual Switch command into consideration. In this way, compared with the process shown in FIG. 3, there will be no unnecessary state transition and no traffic loss.

Figure 4:
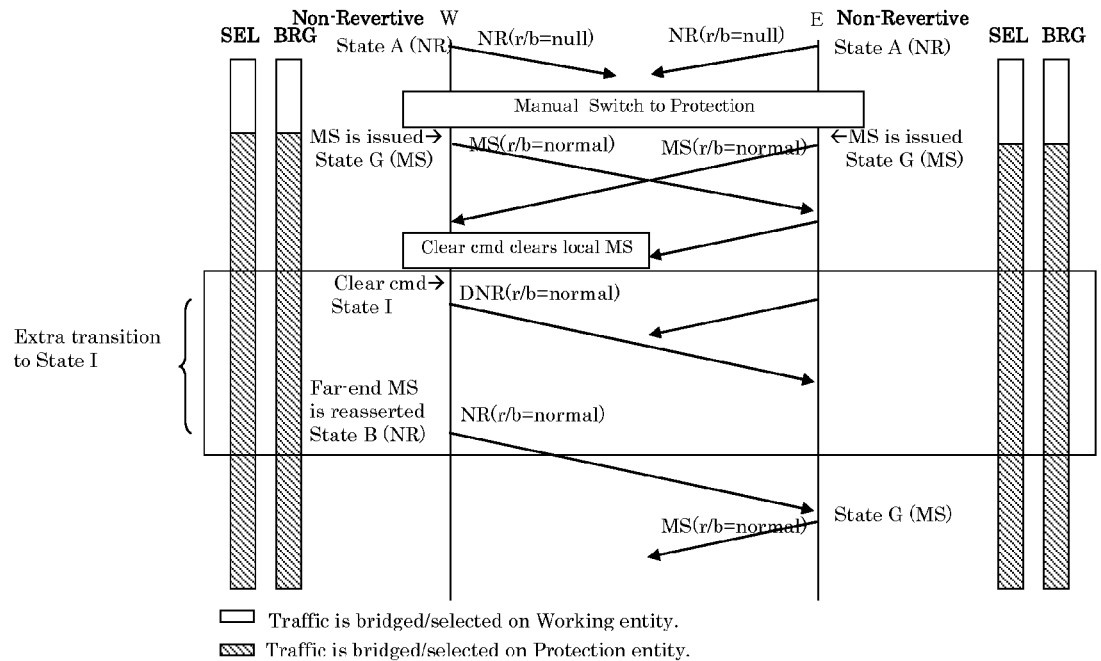
FIG. 4 depicts a schematic diagram of existing state transition in scenario 2*b*.
Figure 12:
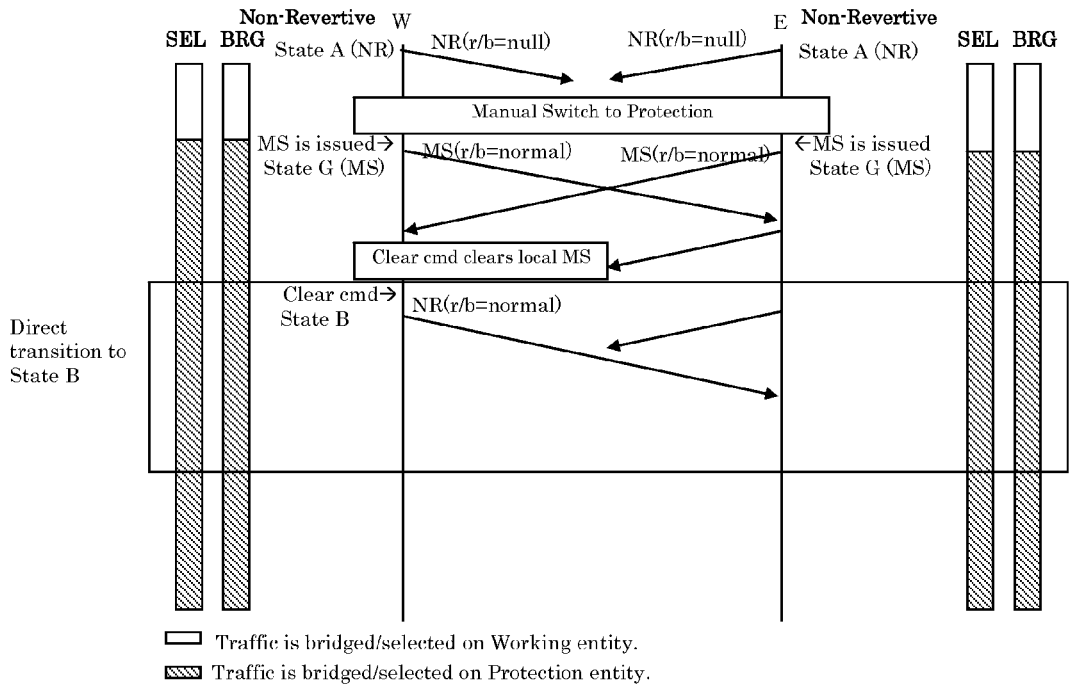
FIG. 12 depicts a schematic diagram of new state transition in scenario 2*b*.

FIG. 12 depicts a schematic diagram of new state transition in scenario 2b of 1:1 bidirectional non-revertive operation. The state transition process is the same as the process described in FIG. 11 and there will be no unnecessary state transition compared with the state transition process shown in FIG. 4.

In a further embodiment of the method, the first state is that a signal failure for protection has been detected by the local network element, a working entity of the local end is active and that a protection entity of the local end is standby. The first message is that a signal failure for working has been detected by the local network element. The second message is that the signal failure for protection has been recovered. And the second state is that the signal failure for working has been detected, the working entity is standby and that the protection entity is active.

Figure 5:
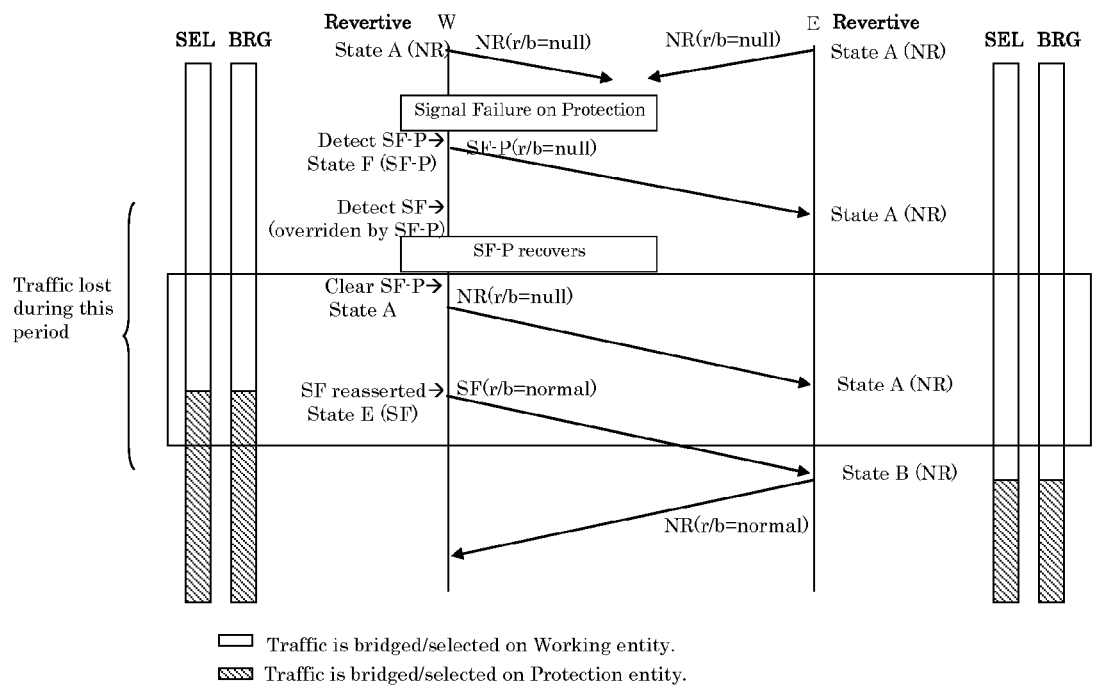
FIG. 5 depicts a schematic diagram of existing state transition in scenario 3*a*.
Figure 13:
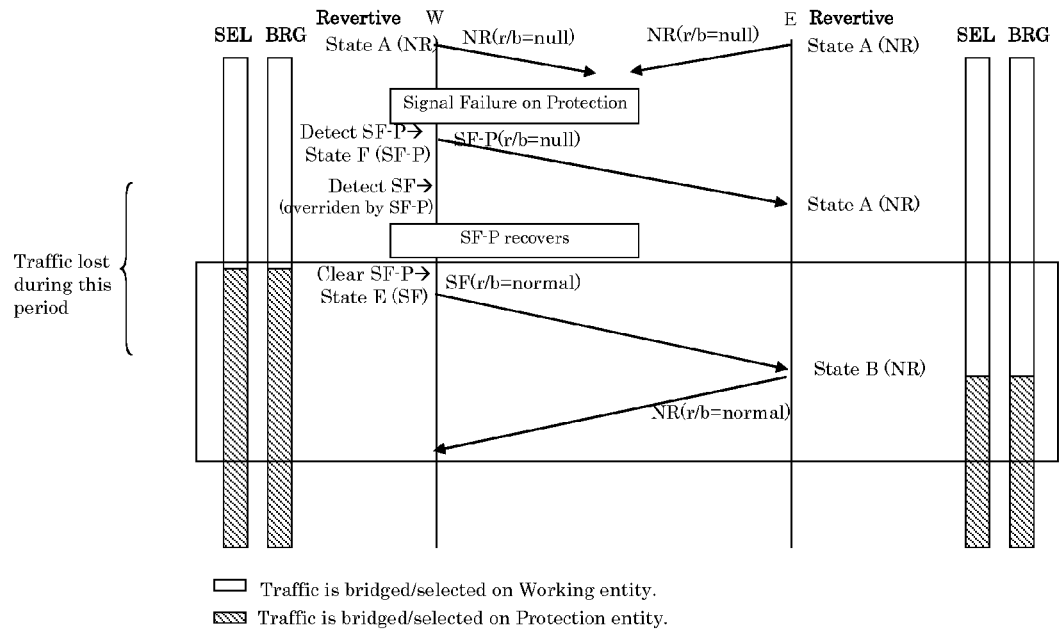
FIG. 13 depicts a schematic diagram of new state transition in scenario 3*a*.

FIG. 13 depicts a schematic diagram of new state transition in scenario 3a. Referring to FIG. 13, in scenario 2a of 1:1 bidirectional revertive operation, the current state of the local NE is State F after Signal Failure on Protection is detected by the local NE. When the local NE detects that Signal Failure on Protection has recovered, the local NE also detects Signal Failure on Working that is overridden by Signal Failure on Protection detected by the local NE. According to one embodiment of the present invention, the state changes directly from State F to State E by taking both Signal Failure on Working and the Signal Failure on Protection Recovers detected by the local NE. In this way, compared with the process shown in FIG. 5, there will be no unnecessary state transition and less traffic loss.

Figure 6:
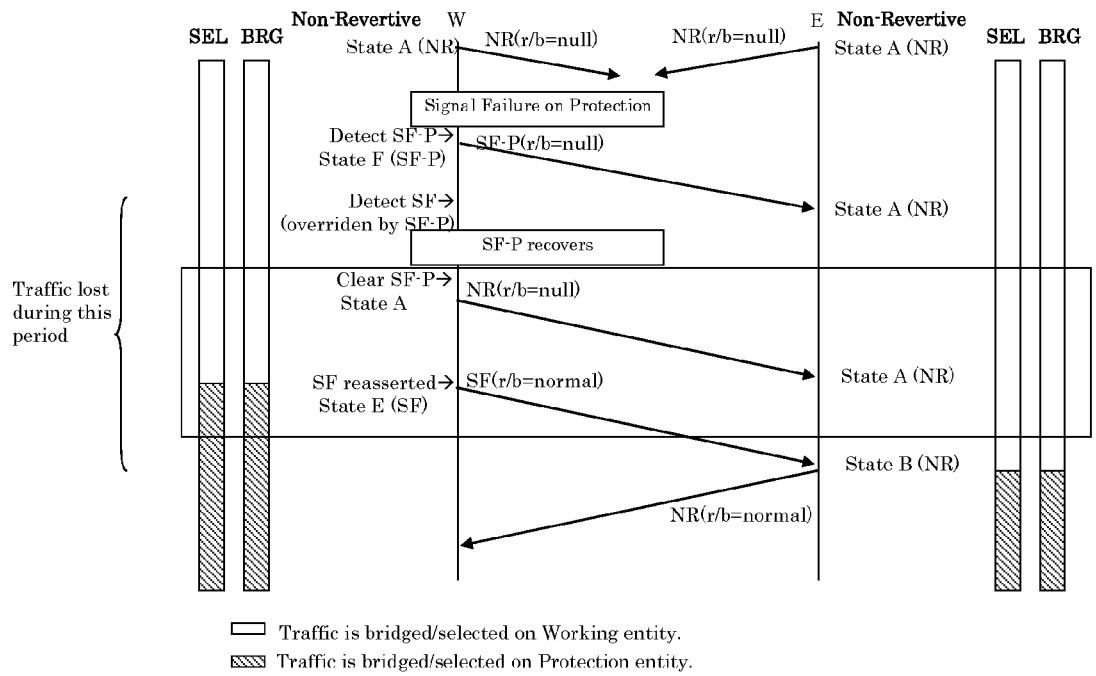
FIG. 6 depicts a schematic diagram of existing state transition in scenario 3*b*.
Figure 14:
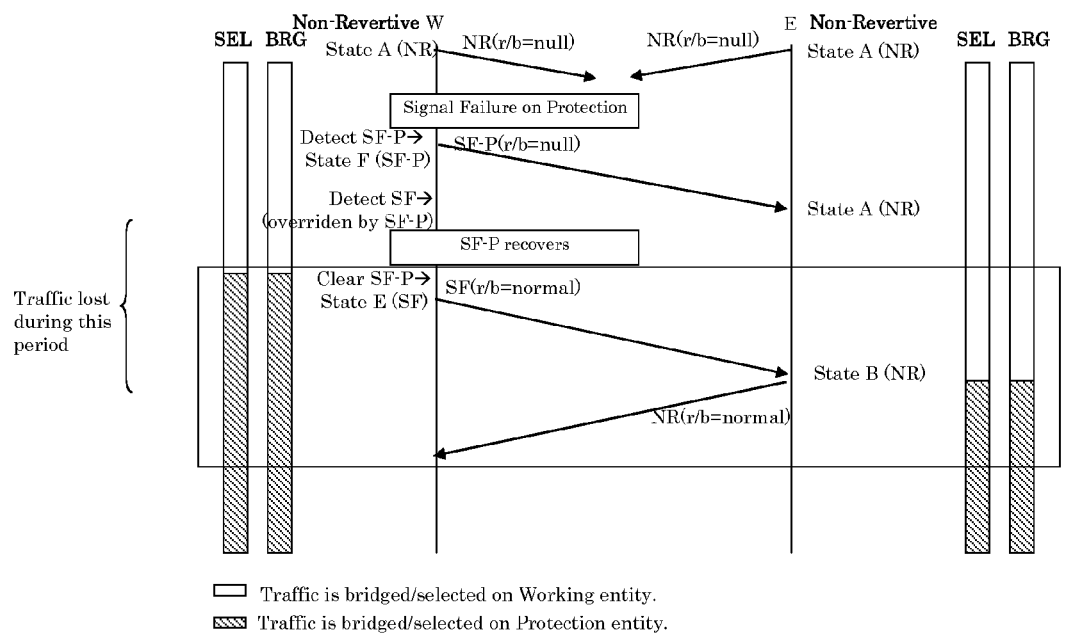
FIG. 14 depicts a schematic diagram of new state transition in scenario 3*b*.

FIG. 14 depicts a schematic diagram of new state transition in scenario 3b of 1:1 bidirectional non-revertive operation. The state transition process is the same as the process described in FIG. 13 and there will be no unnecessary state transition compared with the state transition process shown in FIG. 6.

State transition processes of 1+1 bidirectional revertive and non-revertive operation are similar to the state transition processes of 1:1 bidirectional revertive and non-revertive operation as described above and will not be elaborated here for the aim of simplicity.

In a further another embodiment of the method, the first state is that a first Exercise command from the local network element has been executed, a working entity of the local end is standby and that a protection entity of the local end is active. The first message is a second Exercise command from a far-end network element. The second message is a Clear command. And the second state is that a Reverse Request has been signaled to the far end network element, the working entity is standby and that the protection entity is active.

Figure 7:
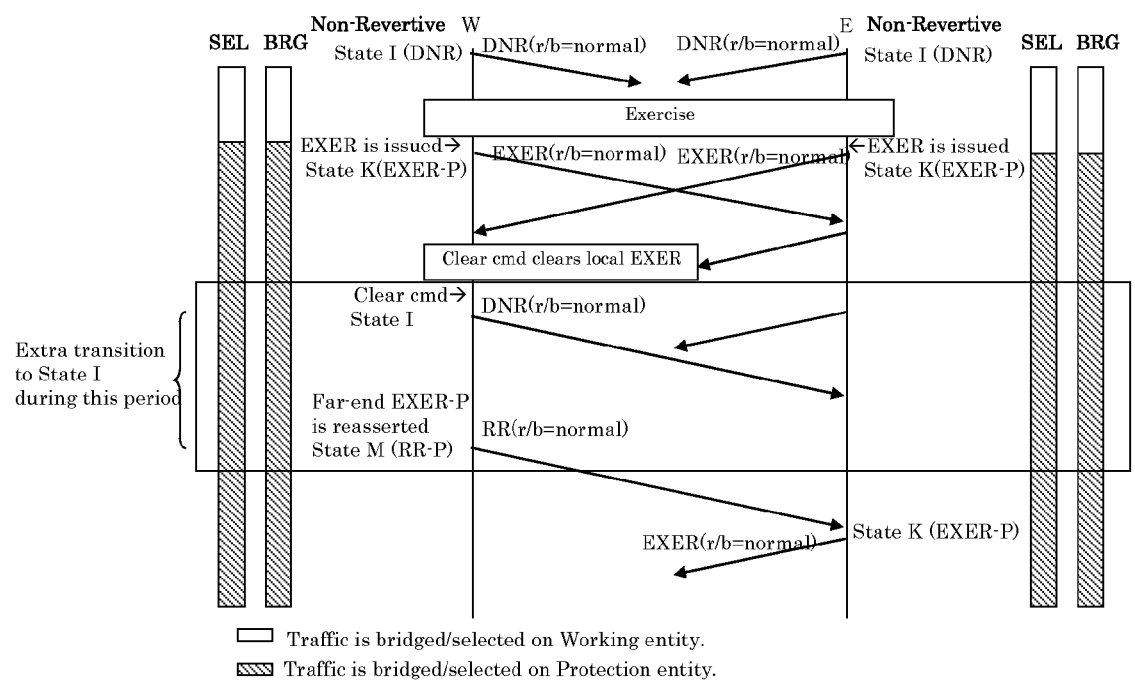
FIG. 7 depicts a schematic diagram of existing state transition in scenario 4
Figure 15:
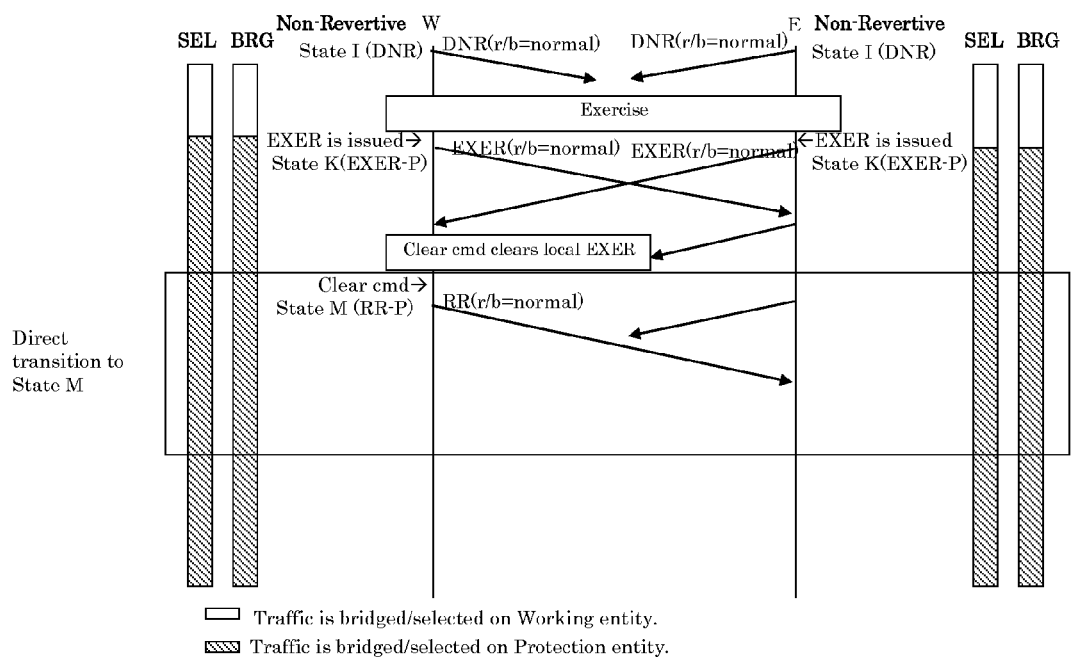
FIG. 15 depicts a schematic diagram of new state transition in scenario 4.

FIG. 15 depicts a schematic diagram of new state transition in scenario 4. Referring to FIG. 15, in scenario 4 of 1:1 bidirectional non-revertive operation, the current state of the local NE is State K after receiving an Exercise command from the local NE. When a Clear command is issued to clear the local Exercise command, the local NE also receives a far-end Exercise command via APS that is previously overridden by the local Exercise command. According to one embodiment of the present invention, the state changes directly from State K to State M by taking both the Clear command and the far-end Exercise command into consideration. In this way, there will be no unnecessary state transition compared with the process shown in FIG. 7. State transition processes of 1+1 bidirectional non-revertive operation are similar to the state transition processes of 1:1 bidirectional non-revertive operation as described in this embodiment and will not be elaborated here for the aim of simplicity.

According to embodiments of the method, part of the Table A.1 and Table A.5 are changed as shown in Table 2. The state transition in [ ] is the new added state transition.

TABLE 2

| | | | Local request | |
|---|---|---|---|---|
| | | | f Protection Recovers | h |
| | State | Signaled APS | from SF | Clear |
| D | Forced Switch Working/Standby Protection/Active | FS [r/b = normal] | N/A | →I or →E$^{c)}$ [or →B$^{b)}$] |
| F | Signal Fail (P) Working/Active Protection/Standby | SF-P [r/b = null] | →A [or →E$^{c)}$] | N/A |
| G | Manual Switch Working/Standby Protection/Active | MS [r/b = normal] | N/A | →A [or →B$^{g)}$] |

NOTE 1

"N/A" means that the event is not expected to happen for the State. However if it does happen, the event should be ignored.

$^{b)}$If FS is indicated in the received APS from the far end.

$^{c)}$If SF is reasserted.

$^{g)}$If MS is indicated in the received APS from the far end.

According to embodiments of the present invention, part of the Table A.3 and Table A.7 are changed as shown in Table 3. The state transition in [ ] is the new added state transition.

TABLE 3

| | | Local request | |
|---|---|---|---|
| State | Signaled APS | f<br>Protection<br>Recovers<br>from SF | h<br>Clear |
| D Forced Switch<br>Working/Standby<br>Protection/Active | FS<br>[r/b = normal] | N/A | →I<br>or →E[c)]<br>[or →B[b)]] |
| F Signal Fail (P)<br>Working/Active<br>Protection/Standby | SF-P<br>[r/b = null] | →A<br>[or →E[c)]] | N/A |
| G Manual Switch<br>Working/Standby<br>Protection/Active | MS<br>[r/b = normal] | N/A | →I<br>[or →B[g)]] |
| K Exercise<br>Working/Standby<br>Protection/Active | EXER<br>[r/b = normal] | N/A | →I<br>[or →M[h)]] |

NOTE 1
"N/A" means that the event is not expected to happen for the State. However if it does happen, the event should be ignored.
[b)]If FS is indicated in the received APS from the far end.
[c)]If SF is reasserted.
[g)]If MS is indicated in the received APS from the far end.
[h)]If EXER [r/b = normal] is indicated in the received APS from the far end.

Secondly, there is provided a state transition means for state transition for a local end of a protection group of Ethernet linear protection switching in a local NE.

A protection group comprises a working entity and a protection entity. There are two ends in a protection group, one is the local end and another is a far-end. G.8031 specifies several states. States of the local end and the far end can be different or same. A state/command having a relative higher priority can change a state having a relative lower priority.

Figure 16:
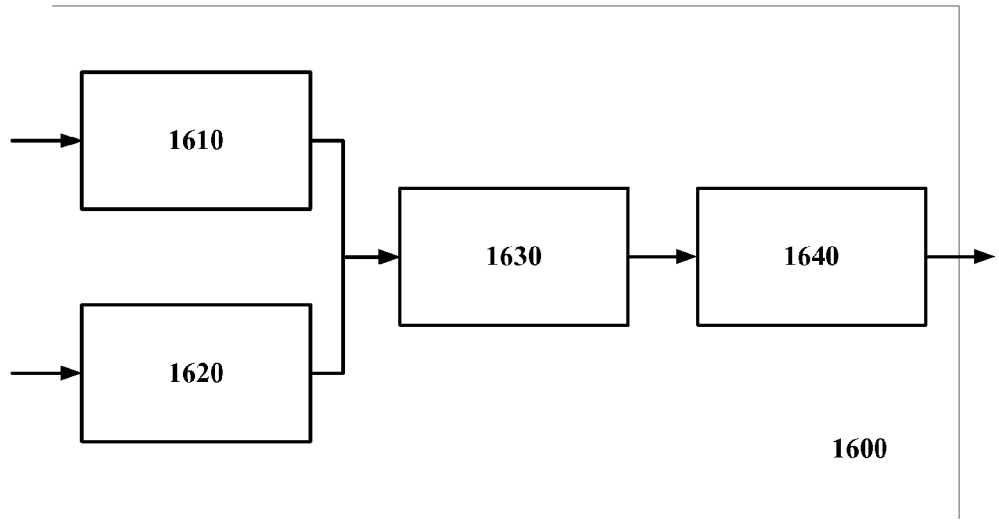
FIG. 16 depicts a schematic diagram of one embodiment of the state transition means according to the invention.

FIG. 16 depicts a schematic diagram of one embodiment of the state transition means 1400 according to the invention.

Referring to FIG. 16, the state transition means 1600 comprises a first receiving means 1610, a second receiving means 1620, a determining means 1630 and a changing means 1640.

The first receiving means 1610 is configured to change the state of the local end with a first state. The first message is overridden by the first state. The first message is overridden by the first state for many reasons, for example, the first message's priority is the same as the first state's priority or the state to be obtained by the first message is the same as the first state.

The second receiving means 1620 is configured to receive a second message configured to change the state of the local end. The second message is received by the local NE after the time or at the same time when the first message is received. The local NE can set a predefined timer and update received messages periodically according to the predefined timer.

The determining means 1630 is configured to determine a second state of the local end on the basis of the first message and the second message. In one period determined by the predefined timer, the local UE receives both the first message and the second message and determines the second state based on the first message and the second message.

The changing means 1640 is configured to change the state of the local end into the second state.

In one embodiment of the state transition means, the first state is that a first Forced Switch command from the local network element has been executed, a working entity of the local end is standby and that a protection entity of the local end is active. The first message is a second Forced Switch command from a far-end network element. The second message is a Clear command. And the second state is that there is no request, the working entity is standby and that the protection entity is active.

In another embodiment of the state transition means, the first state is that a first Manual Switch command from the local network element has been executed, a working entity of the local end is standby and that a protection entity of the local end is active. The first message is a second Manual Switch command from a far-end network element. The second message is a Clear command. The second state is that there is no request, the working entity is standby and that the protection entity is active.

In a further embodiment of the state transition means, the first state is that a signal failure for protection has been detected by the local network element, a working entity of the local end is active and that a protection entity of the local end is standby. The first message is that a signal failure for working has been detected by the local network element. The second message is that the signal failure for protection has been recovered. And the second state is that the signal failure for working has been detected, the working entity is standby and that the protection entity is active.

The above embodiments of the state transition means can be applied to 1+1 bidirectional revertive and non-revertive operation or 1:1 bidirectional revertive and non-revertive operation.

In a further another embodiment of the method, the first state is that a first Exercise command from the local network element has been executed, a working entity of the local end is standby and that a protection entity of the local end is active. The first message is a second Exercise command from a far-end network element. The second message is a Clear command. And the second state is that a Reverse Request has been signaled to the far end network element, the working entity is standby and that the protection entity is active. This embodiment of the state transition means can be applied to 1+1 bidirectional non-revertive operation or 1:1 bidirectional non-revertive operation.

It should be noted that the above-mentioned embodiments illustrate rather than limit the invention and that those skilled in the art would be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the apparatus claims enumerating several units, several of these units can be embodied by one and the same item of hardware or software. The usage of the words first, second and third, et cetera, does not indicate any ordering. These words are to be interpreted as names.

The invention claimed is:

1. A method of state transition for a local end of a protection group of Ethernet linear protection switching in a local network element, comprising the steps of:
    receiving, at the local end, a first message configured to change the state of the local end with a first state, the first message being overridden by the first state;
    receiving, at the local end, a second message configured to change the state of the local end;
    determining, at the local end, a second state of the local end on the basis of the first message and the second message; and
    changing, at the local end, the state of the local end into the second state.

2. The method of claim 1, wherein
    the first state comprises a first Forced Switch command from the local network element that has been executed, a working entity of the local end in a standby state and a protection entity of the local end in an active state;

the first message is a second Forced Switch command from a far-end network element;

the second message is a Clear command; and the second state is that there is no request, the working entity is in the standby state and the protection entity is in the active state.

3. The method of claim 2, wherein the protection group is in a linear 1+1 bidirectional revertive mode, a linear 1+1 bidirectional non-revertive mode, a linear 1:1 bidirectional revertive mode, or a linear 1:1 bidirectional non-revertive mode.

4. The method of claim 1, wherein the first state comprises a first Manual Switch command from the local network element that has been executed, a working entity of the local end in a standby state and a protection entity of the local end in an active state;

the first message is a second Manual Switch command from a far-end network element;

the second message is a Clear command; and the second state is that there is no request, the working entity is in the standby state and the protection entity is in the active state.

5. The method of claim 1, wherein the first state comprises a signal failure for protection that has been detected by the local network element, a working entity of the local end is in an active state and a protection entity of the local end is in a standby state;

the first message is that a signal failure for the working entity has been detected by the local network element;

the second message is that the signal failure for the protection entity has been recovered; and the second state comprises the signal failure for the working entity that has been detected, the working entity is in the standby state and the protection entity is in the active state.

6. The method of claim 1, wherein the first state comprises a first Exercise command from the local network element that has been executed, a working entity of the local end in a standby state and a protection entity of the local end in an active state;

the first message is a second Exercise command from a far-end network element;

the second message is a Clear command; and the second state comprises a Reverse Request that has been signaled to the far end network element, the working entity is in the standby state and the protection entity is in the active state.

7. The method of claim 6, wherein the protection group is in a linear 1:1 bidirectional non-revertive mode or a linear 1+1 bidirectional non-revertive mode.

8. The method of claim 1, wherein the first message is overridden by the first state when the first message's priority is the same as the first state's priority or the state to be obtained by the first message is the same as the first state.

9. The method of claim 1, wherein the second message is received by the local network element after the time or at a same time when the first message is received.

10. A state transition means for state transition for a local end of a protection group of Ethernet linear protection switching in a local network element, comprising:

a first receiving means, at the local end, configured to receive a first message configured to change the state of the local end with a first state, the first message being overridden by the first state;

a second receiving means, at the local end, configured to receive a second message configured to change the state of the local end;

a determining means, at the local end, configured to determine a second state of the local end on the basis of the first message and the second message; and a changing means, at the local end, configured to change the state of the local end into the second state.

11. The state transition means of claim 10, wherein the first state comprises a first Forced Switch command from the local network element that has been executed, a working entity of the local end in a standby state and a protection entity of the local end in an active state;

the first message is a second Forced Switch command from a far-end network element;

the second message is a Clear command; and the second state is that there is no request, the working entity is in the standby state and the protection entity is in the active state.

12. The state transition means of claim 11, wherein the protection group is in a linear 1+1 bidirectional revertive mode, a linear 1+1 bidirectional non-revertive mode, a linear 1:1 bidirectional revertive mode, or a linear 1:1 bidirectional non-revertive mode.

13. The state transition means of claim 10, wherein the first state comprises a first Manual Switch command from the local network element that has been executed, a working entity of the local end in a standby state and a protection entity of the local end in an active state;

the first message is a second Manual Switch command from a far-end network element;

the second message is a Clear command; and the second state is that there is no request, the working entity is in the standby state and the protection entity is in the active state.

14. The state transition means of claim 10, wherein the first state comprises a signal failure for protection that has been detected by the local network element, a working entity of the local end in an active state and a protection entity of the local end in a standby state;

the first message is that a signal failure for the working entity has been detected by the local network element;

the second message is that the signal failure for the protection entity has been recovered; and the second state comprises the signal failure for the working entity that has been detected, the working entity is in the standby state and the protection entity is in the active state.

15. The state transition means of claim 10, wherein the first state comprises a first Exercise command from the local network element that has been executed, a working entity of the local end in a standby state and a protection entity of the local end in an active state;

the first message is a second Exercise command from a far-end network element;

the second message is a Clear command; and the second state comprises a Reverse Request that has been signaled to the far end network element, the working entity is in the standby state and the protection entity is in the active state.

16. The state transition means of claim 15, wherein the protection group is in a linear 1:1 bidirectional non-revertive mode or a linear 1+1 bidirectional non-revertive mode.

* * * * *